United States Patent
Maheshwari et al.

(10) Patent No.: US 9,083,577 B2
(45) Date of Patent: Jul. 14, 2015

(54) SAMPLER CIRCUIT FOR A DECISION FEEDBACK EQUALIZER AND METHOD OF USE THEREOF

(71) Applicant: Nvidia Corporation, Santa Clara, CA (US)

(72) Inventors: Sanjeev Maheshwari, Fremont, CA (US); Vishnu Balan, Santa Clara, CA (US); Arif Amin, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 113 days.

(21) Appl. No.: 13/896,457

(22) Filed: May 17, 2013

(65) Prior Publication Data

US 2014/0341268 A1    Nov. 20, 2014

(51) Int. Cl.
*H03H 7/30* (2006.01)
*H04L 25/03* (2006.01)

(52) U.S. Cl.
CPC .... *H04L 25/03885* (2013.01); *H04L 25/03146* (2013.01)

(58) Field of Classification Search
CPC ........... H04L 7/0338; H04L 7/06; H04L 7/10; H04L 7/0331; H04L 7/033; H03K 3/356139; H03K 3/0372; G06F 1/12; G11C 27/02; G11C 19/00
USPC .......................... 375/232–233, 350, 355, 371; 327/202–203
See application file for complete search history.

(56) References Cited

U.S. PATENT DOCUMENTS

| | | | |
|---|---|---|---|
| 8,472,515 B1* | 6/2013 | Savoj | 375/233 |
| 2008/0297219 A1* | 12/2008 | Manohar et al. | 327/202 |
| 2013/0049836 A1* | 2/2013 | Yang et al. | 327/203 |
| 2013/0082757 A1* | 4/2013 | Kobayashi et al. | 327/202 |

* cited by examiner

*Primary Examiner* — Khanh C Tran

(57) ABSTRACT

A sampler circuit for a decision feedback equalizer and a method of use thereof. One embodiment of the sampler circuit includes: (1) a first sampler portion including a series-coupled first master regeneration latch and first slave latch, (2) a second sampler portion including a series-coupled second master regeneration latch and second slave latch, and (3) a first feedback circuit coupled to a first node between the first master regeneration latch and the first slave latch and operable to provide a feedback signal to the second master regeneration latch to cause a bias charge to be built up therefor.

19 Claims, 4 Drawing Sheets

SAMPLER CIRCUIT FOR A DECISION FEEDBACK EQUALIZER AND METHOD OF USE THEREOF

TECHNICAL FIELD

Figure 1:
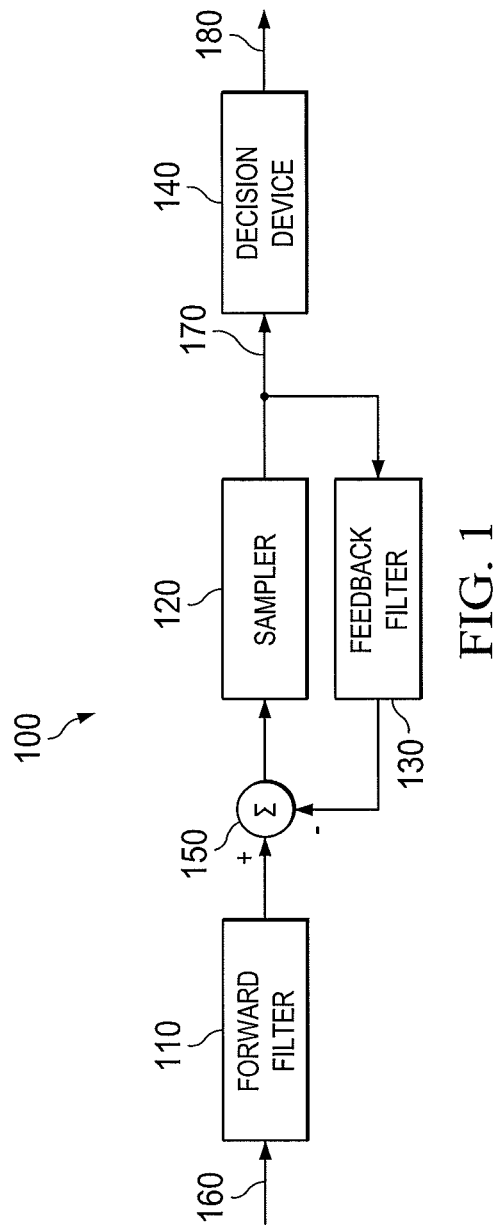

This application is directed, in general, to high-speed samplers and, more specifically, to high-speed samplers having a decision feedback equalizer (DFE).

BACKGROUND

Serial communication channels are common in telecommunications and computer architectures. In serial communication, data is transmitted sequentially, one bit at a time, over a communication channel or bus. Serial channels can be clocked at higher speeds than alternative parallel channels, but move a fraction of the data over the channel per clock cycle. As high-speed serial technology develops, serial channels are clocked at increasingly higher frequencies and can support increasingly higher data rates.

One such development in high-speed serial communication is the decision feedback equalizer, or "DFE." Generally, as serial channels become faster, they experience increased data loss, i.e. become "lossy." DFEs have proven to be efficient at mitigating high-speed lossy channels, allowing increased data rates at the receiver. A DFE uses a previous detector decision on a bit to reduce inter-symbol interference (ISI) on the current bit being detected. This reduces errors on the serial channel and allows for higher data rates.

SUMMARY

One aspect provides a sampler for sampling an input signal state. In one embodiment, the sampler includes: (1) a first sampler portion including a series-coupled first master regeneration latch and first slave latch, (2) a second sampler portion including a series-coupled second master regeneration latch and second slave latch, and (3) a first feedback circuit coupled to a first node between the first master regeneration latch and the first slave latch and operable to provide a feedback signal to the second master regeneration latch to cause a bias charge to be built up therefor.

Another aspect provides a method of sampling an input signal. In one embodiment, the method includes: (1) regenerating a first state of the input signal in a first sampler portion, (2) feeding back a regenerated first state to an input stage of a second sampler portion, (3) summing a feedback current with the input signal, and (4) tracking a second state of the input signal in the second sampler portion.

Yet another aspect provides a DFE. In one embodiment, the DFE includes: (1) a sampler, including: (1a) an odd sampler portion including a series-coupled first master regeneration latch and first slave latch, (1b) an even sampler portion including a series-coupled second master regeneration latch and second slave latch, (1c) a current source operable to provide a bias charge, (1d) a first feedback circuit having an input coupled to a first node between said first master regeneration latch and said first slave regeneration latch and an output coupled to said second master regeneration latch and operable to provide a first feedback signal scaling said bias charge for said second master regeneration latch during a track mode of said sampler, and (1e) a second feedback circuit having an input coupled to a second node between said second master regeneration latch and said slave latch and an output coupled to said first master regeneration latch and operable to provide a second feedback signal scaling said bias charge for said first master regeneration latch during said track mode, and (2) a latch chain coupled to said sampler.

BRIEF DESCRIPTION

Figure 2:
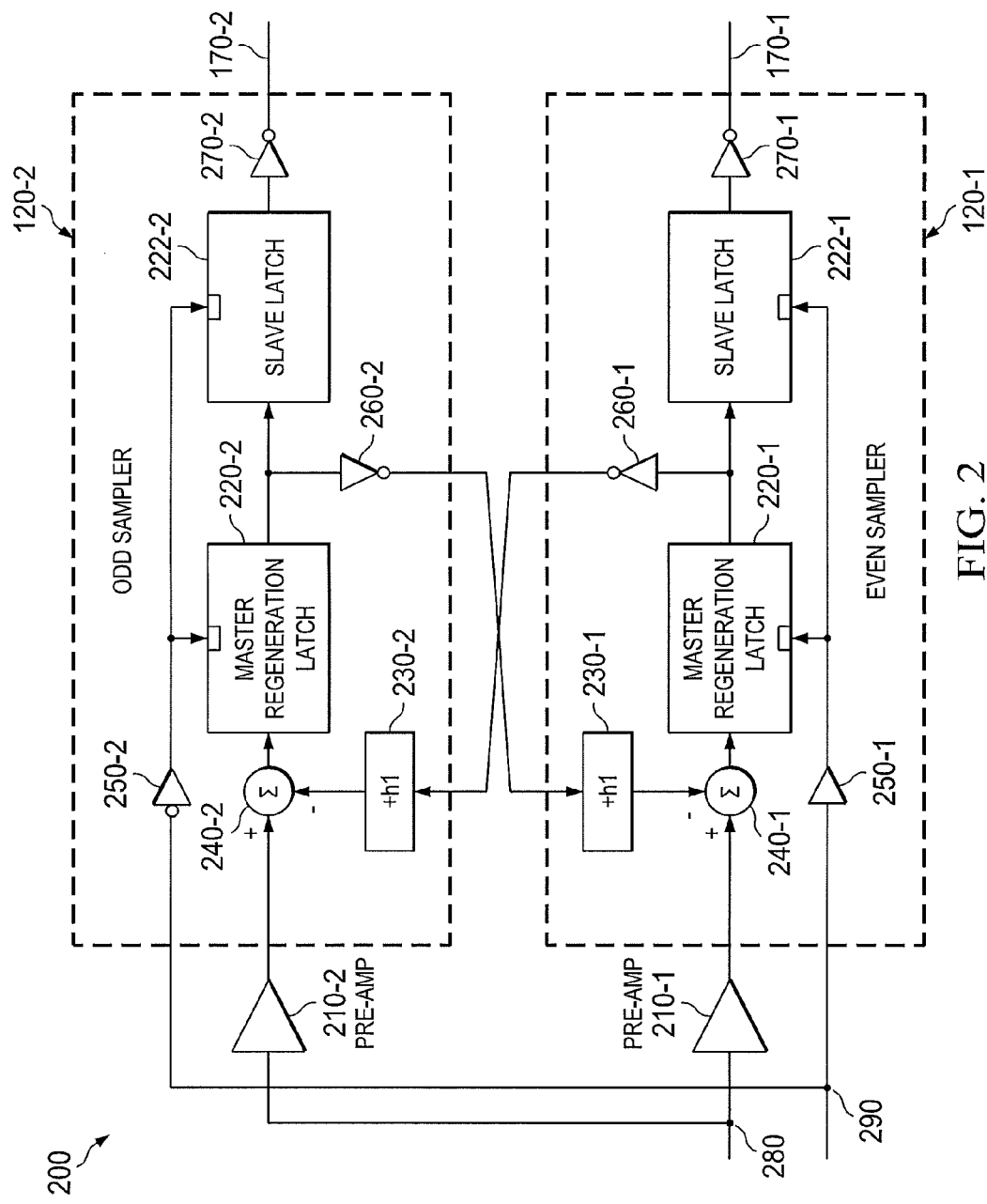
Figure 3:
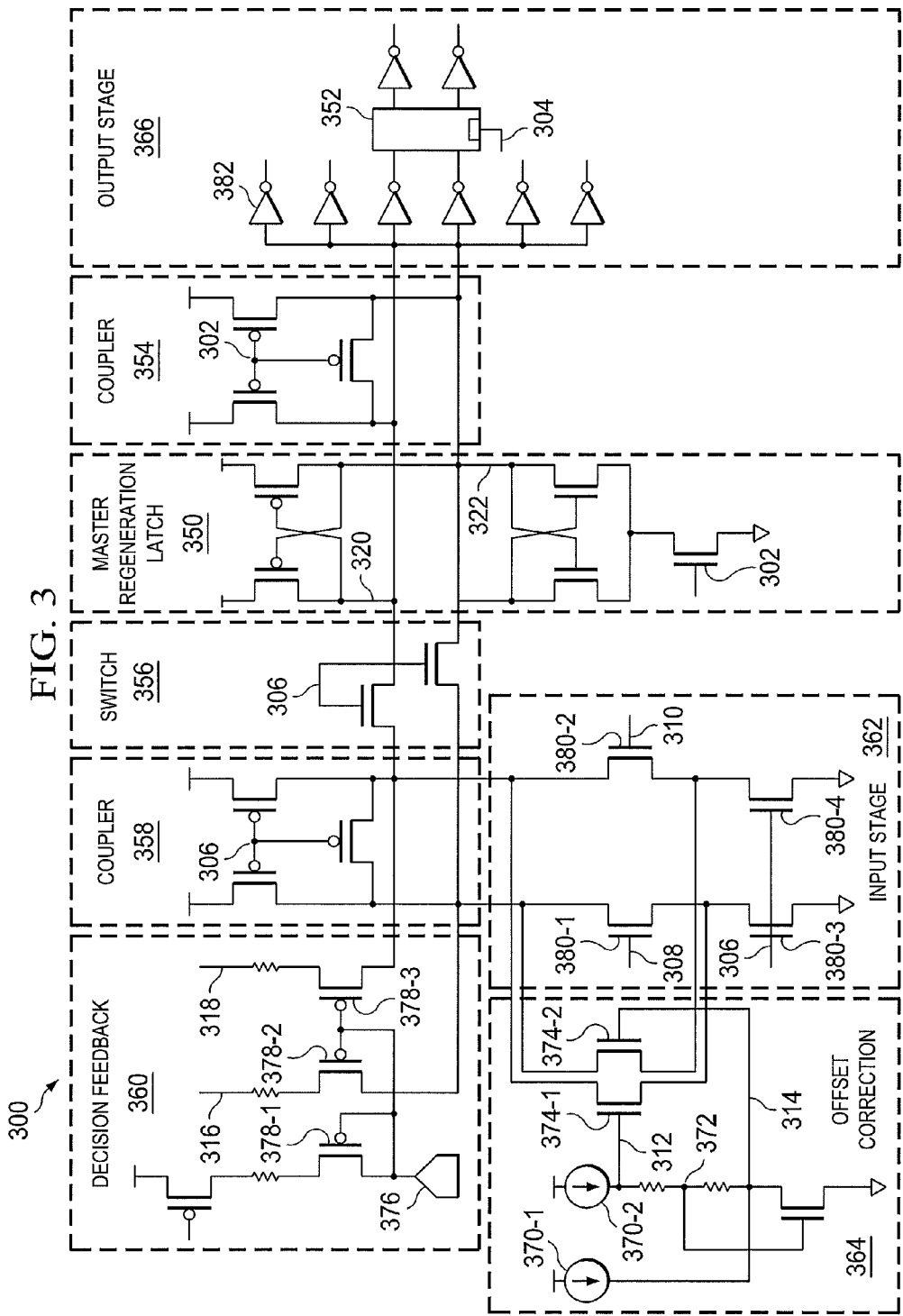
Figure 4:
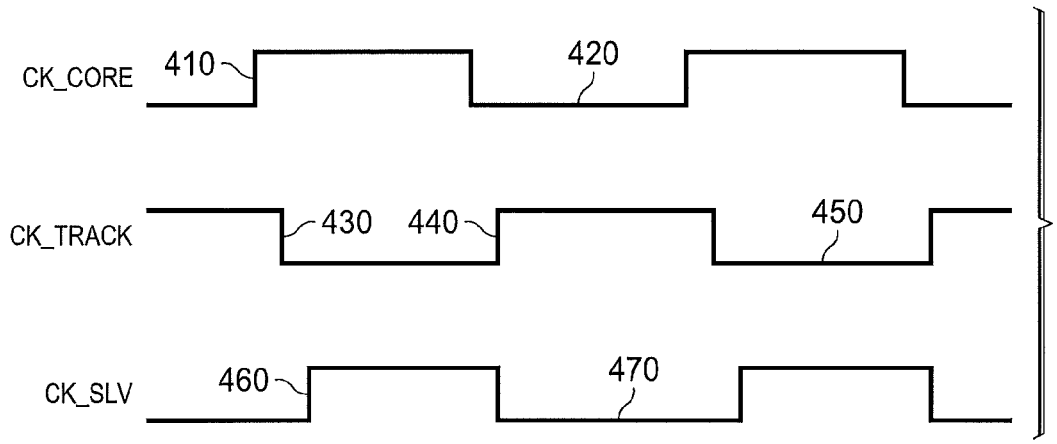
Figure 5:
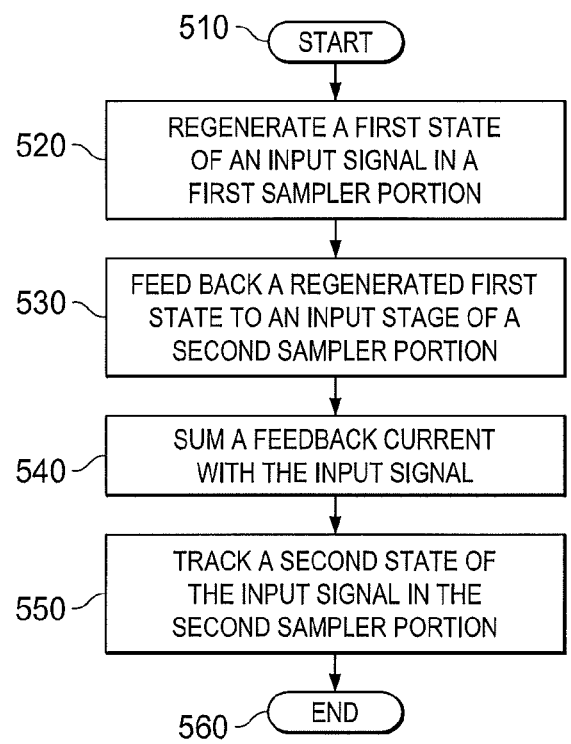

Reference is now made to the following descriptions taken in conjunction with the accompanying drawings, in which:
FIG. 1 is a block diagram of one embodiment of a DFE;
FIG. 2 is a functional block diagram of one embodiment of a sampler for the DFE embodiment of FIG. 1;
FIG. 3 is a schematic diagram of one embodiment of the sampler embodiment of FIG. 2;
FIG. 4 is a timing diagram for the sampler embodiment of FIG. 3; and
FIG. 5 is a flow diagram of one embodiment of a method of sampling an input signal.

DETAILED DESCRIPTION

DFEs are often implemented in serial communication channels to extend data rates over lossy channels. For example, many high-speed serial computer buses include DFEs on processor-to-processor interfaces, including GPU to GPU, CPU to CPU and CPU to GPU. Though beneficial, implementations of the DFE at high data rates consume a great deal of power. Particularly, increased data rates often require the DFE loop be "un-rolled" to meet strict feedback timing constraints. DFE loop un-rolling avoids creating a critical path, which alleviates timing constraints, but at the cost of additional components and, consequently, increased power consumption. For example, a two-tap loop-unrolled DFE requires four data samplers as opposed to just one. As such, as data rates on high-speed serial channels increase, so does power consumption.

It is realized herein that a low-power high-speed serial receiver can be had by applying decision feedback within the DFE sampler and without loop un-rolling. Using the decision feedback allows a charge to be built up in the sampler's regeneration latch while the sampler is tracking the current input signal pulse. The built-up charge allows for a faster regeneration of the quantized data at the output. It is further realized herein the faster-operating sampler produces a quicker decision at the "first tap" of the DFE, which allows for higher data rates for the receiver as a whole.

FIG. 1 is a block diagram of one embodiment of a DFE 100. DFE 100 includes a forward filter 110, a sampler 120, a feedback filter 130, a decision device 140 and a summer 150. A digital input signal 160 is passed through forward filter 110. The result is summed with decision feedback by summer 150 and then sampled by sampler 120. A quantized signal 170 from sampler 120 is passed through feedback filter 130 and then subtracted from the input signal. Quantized signal 170 also goes to decision device 140, which detects either a one or zero from quantized signal 170 and produces a digital data output 180.

The primary role of forward filter 110 is to condition digital input signal 160, received over a serial channel for subsequent detection, which is to abstract transmitted data from the received signal. For example, forward filter 110 can be a transversal filter or "tapped delay line filter." This type of filter operates by passing an input signal through a series of delay elements, the outputs of which are all weighted and summed to form the output. Forward filter 110 helps reduce noise on the input line.

Similarly operated, feedback filter 130 uses quantized signal 170 as an input and its output is subtracted from the forward filtered signal going into sampler 120. Feedback filter 130 uses previous decisions to approximate error in previous pulses so it can be subtracted from a current pulse.

FIG. 2 is a functional block diagram of one embodiment of a sampler 200 for DFE 100 of FIG. 1. Sampler 200 includes an even sampler 120-1 and an odd sampler 120-2 that are cross-coupled with feedback circuits. An input signal 280 passes through pre-amplifiers 210-1 and 210-2 before reaching even sampler 120-1 and odd sampler 120-2, respectively. Each sampler is also clocked by a clock signal 290, clock signal 290 being inverted for clocking odd sampler 120-2. Even sampler 120-1 produces an output signal 170-1, and odd sampler 120-2 produces an output signal 170-2.

Each of even sampler 120-1 and odd sampler 120-2 includes two latches in series, master regeneration latch 220-1 and slave latch 222-1 in even sampler 120-1, and master regeneration latch 220-2 and slave latch 222-2 in odd sampler 120-2. Each sampler also includes a clock buffer 250-1 and 250-2, output buffers 270-1 and 270-2, and feedback buffers 260-1 and 260-2.

The buffered decision feedback from even sampler 120-1 is tapped between master regeneration latch 220-1 and slave latch 222-1 and drives a first tap +h1 transfer function 230-2 having an output that is subtracted from the pre-amplified input signal to odd sampler 120-2. Likewise, the buffered decision feedback from odd sampler 120-2 is tapped between master regeneration latch 220-2 and slave latch 222-2 and drives a first tap +h1 transfer function 230-1 having an output that is subtracted from the pre-amplified input signal to even sampler 120-1.

Transfer functions +h1 230-1 and +h1 230-2 can be simple. For example, each could simply be a scaling of a current source to help build up the charge in their respective cross-coupled latches, master regeneration latch 220-1 and master regeneration latch 220-2.

As a pulse of input signal 280 propagates through sampler 200, it is tracked and regenerated by both even sampler 120-1 and odd sampler 120-2; however, the two sampler portions track and regenerate out of phase due to their clocks being inverted with respect to the other. For example, consider a first pulse of input signal 280 arriving at even sampler 120-1. Master regeneration latch 220-1 tracks the pulse during a track phase, and then regenerates the pulse during a regenerate phase. While in regenerate, the regenerated pulse is tracked by slave latch 222-1. The regenerated pulse is also fed back through transfer function +h1 230-2 and summed into the pre-amplified pulse arriving at odd sampler 120-2 by a summer 240-2. While odd sampler 120-2 is tracking the pulse, a charge is built up on master regeneration latch 220-2 due to the feedback current from transfer function +h1 230-2. When odd sampler 120-2 switches to regenerate, the regenerated pulse is tracked by slave latch 222-2 and fed back to even sampler 120-1 through transfer function +h1 230-1. The regenerated pulse in even sampler 120-1 is also held in slave latch 222-1 while master regeneration latch 220-1 tracks the next pulse. The output of even sampler 120-1 and odd sampler 120-2 then propagate through respective buffers 270-1 and 270-2.

FIG. 3 is a schematic diagram of one embodiment of a sampler portion of the sampler of FIG. 2. The schematic depicts a sampler 300 and is divided into several stages, including an input stage 362, a decision feedback stage 360, an offset correction stage 364, a master regeneration latch 350, an output stage 366, two coupler stages 358 and 354, and a switch 356.

Input stage 362 includes four NMOS transistors: NMOS 380-1, NMOS 380-2, NMOS 380-3 and NMOS 380-4 arranged in two NMOS transistor stacks. NMOS 380-3 and NMOS 380-4 are controlled by a CK_TRACK signal 306. These two transistors enable and disable input stage 362 by coupling and decoupling a pull-down. An input signal and its negative, a VIP 308 and a VIN 310, couple to sampler 300 at the gates of NMOS 380-1 and NMOS 380-2. When active, input stage 362 operates by one of the NMOS stacks pulling down while the other stays high, according to VIP 308 and VIN 310.

Offset correction 364 operates to inject an offset correction current into the input legs of input stage 362. Offset correction 364 includes two current sources 370-1 and 370-2, a voltage divider 372 and two NMOS transistors 374-1 and 374-2. NMOS 374-1 forms a positive offset current stage with the source line coupled to the source of NMOS 380-1, or the positive input node of input stage 362. NMOS 374-2 forms a negative offset current stage with the source line coupled to the source of NMOS 380-2, or the negative input node of input stage 362. The respective drains of NMOS 374-1 and NMOS 374-2 are pulled down when input stage 362 is active, or CK_TRACK 306 is low. The respective gates of NMOS transistors 374-1 and 374-2 are driven by an offset voltage pair, a VOSP 312 and a VOSN 314. The positive and negative offset voltages are tapped off voltage divider 372, which is driven by offset correction current sources 370-1 and 370-2.

Sampler 300 operates in track mode when CK_TRACK 306 is high. Otherwise, coupler 358 is active. Coupler 358 pulls up the positive and negative input nodes of input stage 362 and also couples them together. When active, coupler 358 ensures no differential can be detected at the nodes of input stage 362. When in track mode (CK_TRACK 306 high), switch 356 couples the nodes of input stage 362 to master regeneration latch 350 and output stage 366 portion of sampler 300.

Sampler 300 operates in regeneration mode when a CK_CORE signal 302 is high. While CK_CORE 302 is low, coupler 354 is active. Coupler 354 pulls up the nodes of output stage 366 and also couples them together. While in track mode, master regeneration latch 350 generates a small differential voltage. The positive and negative nodes of master regeneration latch 350, a QOP 320 and a QON 322 are coupled to the nodes of input stage 362. The PMOS portion of master regeneration latch 350 builds up a charge according to the voltages on QOP 320 and QON 322. While in track mode, the pull-down portion remains inactive.

When sampler 300 is ready to transition from track to regeneration mode, CK_CORE 302 goes high and shortly thereafter CK_TRACK 306 goes low. When CK_CORE 302 goes high, the pull-down portion of master regeneration latch 350 activates and nodes QOP 320 and QON 322 begin regenerating the tracked voltages at the input nodes of input stage 362. Also, coupler 354 deactivates, allowing the output nodes of output stage 366 to be driven. When CK_TRACK 306 finally goes low, switch 356 opens, decoupling input stage 362 from master regeneration latch 350, and coupler 358 is activated, holding the input nodes of input stage 362 to a zero differential, or "in reset." The pull-down of master regeneration latch 350 sinks one PMOS/NMOS stack, and pulls up the other, creating a differential voltage across nodes QOP 320 and QON 322.

Output stage 366 includes a latch 352 clocked by a CK_SLV signal 304. The nodes of latch 352 are coupled to nodes QOP 320 and QON 322 through an inverter bank 382. During regeneration mode (CK_CORE 302 high), CK_SLV goes high, causing latch 352 to track the differential voltage across nodes QOP 320 and QON 322. When CK_SLV goes low again, latch 352 holds that value.

Decision feedback 360 includes a feedback current source, which, in this embodiment, is a digital-to-analog converter (DAC) 376. The amplitude of the output of DAC 376 is digitally controlled, and the current is scaled via a pair of PMOS transistors, PMOS 378-2 and PMOS 378-3 respectively pulled-up to positive and negative feedback signals, a DPP 316 and a DPN 318, from the other sampler phase. When sampler 300 is tracking, a decision feedback current is injected into nodes QOP 320 and QON 322 along with currents from offset correction 364 and input stage 362. The bias created by decision feedback 360 builds up a charge on the PMOS transistors of master regeneration latch 350. Once transitioned into regeneration mode, a differential voltage is achieved quickly and master regeneration latch 350 is able to regenerate the input pulse quickly for subsequent tracking and holding by output stage 366.

FIG. 4 is a timing diagram for the sampler embodiment of FIG. 3. The timing diagram depicts CK_CORE 302, CK_TRACK 306 and CK_SLV 304, all from FIG. 3. These clock signals can be generated by a sampler clock generator. Such a generator can employ digital logic and clock buffering to provide the various clock signals with appropriate phase differences. In the sampler embodiment of FIG. 3, regeneration mode begins at a rising edge of CK_CORE 302. In the timing diagram of FIG. 4, a CK_CORE rising edge 410 indicates the start of regeneration mode. CK_CORE 302 also has a subsequent trough 420, which indicates the sampler is tracking and output stage 366 holds the previous state. While regenerating, CK_TRACK 306 goes low, putting input stage 362 into reset. This is shown in the timing diagram as a CK_TRACK falling edge 430. Upon falling edge 430, input stage 362 is decoupled and the sampled differential voltage begins to develop on nodes QOP 320 and QON 322. Shortly thereafter, CK_SLV 304 goes high, as shown in the timing diagram as CK_SLV rising edge 460. On rising edge 460, latch 352 is activated in output stage 366 and begins tracking the differential voltage.

The sampler transitions to track mode at the rising edge of CK_TRACK 306. In the timing diagram of FIG. 4, a CK_TRACK rising edge 440 indicates the transition. While in track, as mentioned above, CK_CORE goes low, causing output stage 366 to hold. Meanwhile, CK_SLV 304 has gone low, shown by a trough 470, and latch 352 holds the differential voltage. Input stage 362 is recoupled to nodes QOP 320 and QON 322 and a charge is built up in master regeneration latch 350 due to the decision feedback current sourced by decision feedback 360. When CK_TRACK 306 goes low again, during regeneration, input stage 362 goes back into reset. This appears as a trough 450 in the timing diagram of FIG. 4.

FIG. 5 is a flow diagram of one embodiment of a method of sampling an input signal. The method begins at a start step 510. At a regeneration step 520, a first state of an input signal is regenerated in a first sampler portion. In certain embodiments, the regenerated first state from regeneration step 520 is latched and held in a slave sense amplifier or latch while the next state of the input signal is being tracked.

In the embodiment of FIG. 5, the regenerated first state from regeneration step 520 is fed back to an input stage of a second sampler portion in a feedback step 530. Feedback step 530 produces a feedback current that is summed with the input signal at a summing step 540. The feedback current is scaled by the decision on the first state of the input signal. At a tracking step 550, the summed input signal from summing step 540, representing a second state of the input signal, is tracked by the second sampler portion. The additional feedback current causes a charge to build up on the regeneration latch of the second sampler portion. When the second sampler portion transitions to regeneration, this charge allows for a differential voltage to develop quickly across the input nodes of the regeneration latch. Furthermore, in certain embodiments, when the second sampler portion regenerates and eventually returns to tracking, the regenerated signal is latched and held in the second sampler portion. The method then ends at an end step 560.

Those skilled in the art to which this application relates will appreciate that other and further additions, deletions, substitutions and modifications may be made to the described embodiments.

What is claimed is:

1. A sampler for sampling an input signal state, comprising:
   a first sampler portion including a series-coupled first master regeneration latch and first slave latch;
   a second sampler portion including a series-coupled second master regeneration latch and second slave latch; and
   a first feedback circuit coupled to a first node between said first master regeneration latch and said first slave latch and operable to provide a feedback signal to said second master regeneration latch to cause a bias charge to be built up therefor, wherein said bias charge is generated during a track mode of said sampler and subsequent latching occurs in a regeneration mode of said sampler.

2. The sampler as recited in claim 1 wherein said feedback signal is at least partially based on said state as most recently detected by said first sampler portion.

3. The sampler as recited in claim 2 wherein said feedback signal is generated by a current source and is scaled by said most recently detected state.

4. The sampler as recited in claim 1 wherein said second sampler portion further includes an input stage electrically isolated from said second master regeneration latch and said second slave latch during said regeneration mode.

5. The sampler as recited in claim 1 further comprising a sampler clock generator coupled to said first sampler portion and said second sampler portion and configured to control said track mode and said regeneration mode.

6. The sampler as recited in claim 1 further comprising a second feedback circuit coupled to a second node between said second master regeneration latch and said slave latch and operable to provide a feedback signal to said first master regeneration latch to cause a bias charge to be built up therefor.

7. A method of sampling an input signal, comprising:
   regenerating a first state of said input signal in a first sampler portion;
   feeding back a regenerated first state to an input stage of a second sampler portion;
   summing a feedback current with said input signal; and
   tracking a second state of said input signal in said second sampler portion, wherein said feeding back is carried out by a first tap feedback.

8. The method as recited in claim 7 further comprising latching said regenerated first state and holding said regenerated first state during said tracking.

9. The method as recited in claim 7 whereby a regeneration latch for carrying out said tracking said second state is biased by said first state.

10. The method as recited in claim 7 further comprising:
    generating said feedback current; and
    scaling said feedback current based on said regenerated first state.

11. The method as recited in claim 7 further comprising:
regenerating said second state in said second sampler portion; and
feeding back a regenerated second state to an input stage of said first sampler portion and summing another feedback current with said input signal.

12. The method as recited in claim 11 further comprising latching said regenerated second state.

13. The method as recited in claim 11 wherein said input stage of said second sampler portion is deactivated while said second sampler portion is regenerating.

14. A decision feedback equalizer (DFE), comprising:
a sampler, including:
an odd sampler portion including a series-coupled first master regeneration latch and first slave latch,
an even sampler portion including a series-coupled second master regeneration latch and second slave latch,
a current source operable to provide a bias charge,
a first feedback circuit having an input coupled to a first node between said first master regeneration latch and said first slave latch and an output coupled to said second master regeneration latch and operable to provide a first feedback signal scaling said bias charge for said second master regeneration latch during a track mode of said sampler, and
a second feedback circuit having an input coupled to a second node between said second master regeneration latch and said slave latch and an output coupled to said first master regeneration latch and operable to provide a second feedback signal scaling said bias charge for said first master regeneration latch during said track mode; and
a latch chain coupled to said sampler.

15. The DFE as recited in claim 14 wherein said sampler further includes an offset correction current source configured to inject an offset current into said respective input stages of said even sampler portion and said odd sampler portion.

16. The DFE as recited in claim 14 wherein said current source includes a digital to analog converter (DAC).

17. The DFE as recited in claim 14 further comprising a sampler clock generator configured to generate track and generation clocks having distinct phases.

18. The DFE as recited in claim 14 wherein said odd sampler portion and said even sampler portion are configured to operate in opposite phase.

19. The DFE as recited in claim 14 wherein said latch chain provides multiple filter decision taps for said DFE.

* * * * *